Aug. 29, 1950  T. J. SCOFIELD  2,520,344
WINDSHIELD WIPER ACTUATING MEANS
Filed April 11, 1946  2 Sheets-Sheet 1
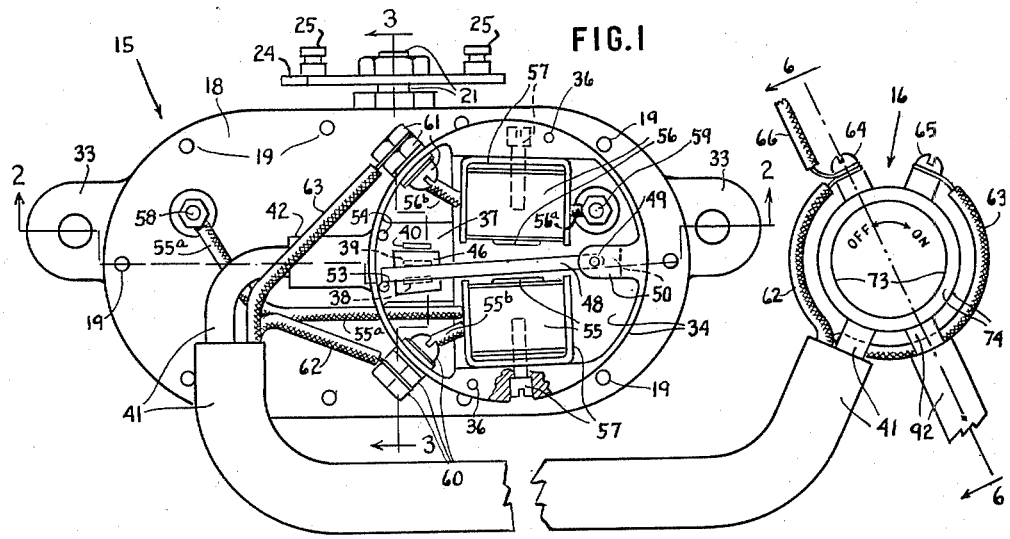
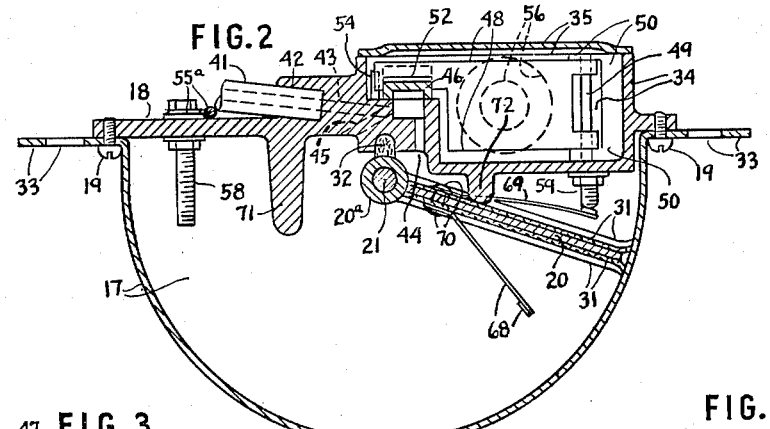
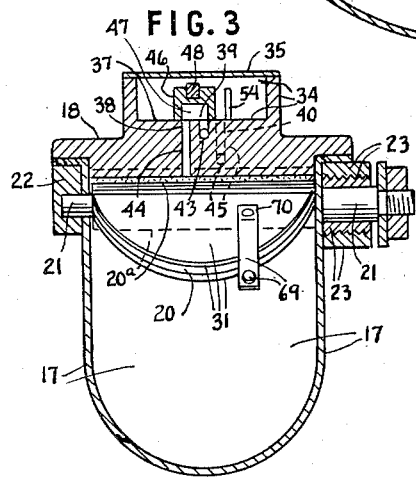
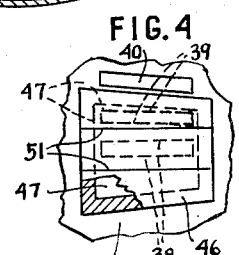
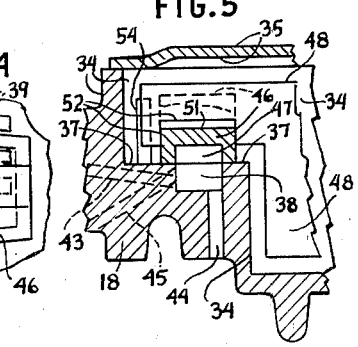
INVENTOR.
Theodore J. Scofield
BY Theodore L. Simonton
ATTORNEY Aug. 29, 1950     T. J. SCOFIELD     2,520,344
WINDSHIELD WIPER ACTUATING MEANS
Filed April 11, 1946     2 Sheets-Sheet 2
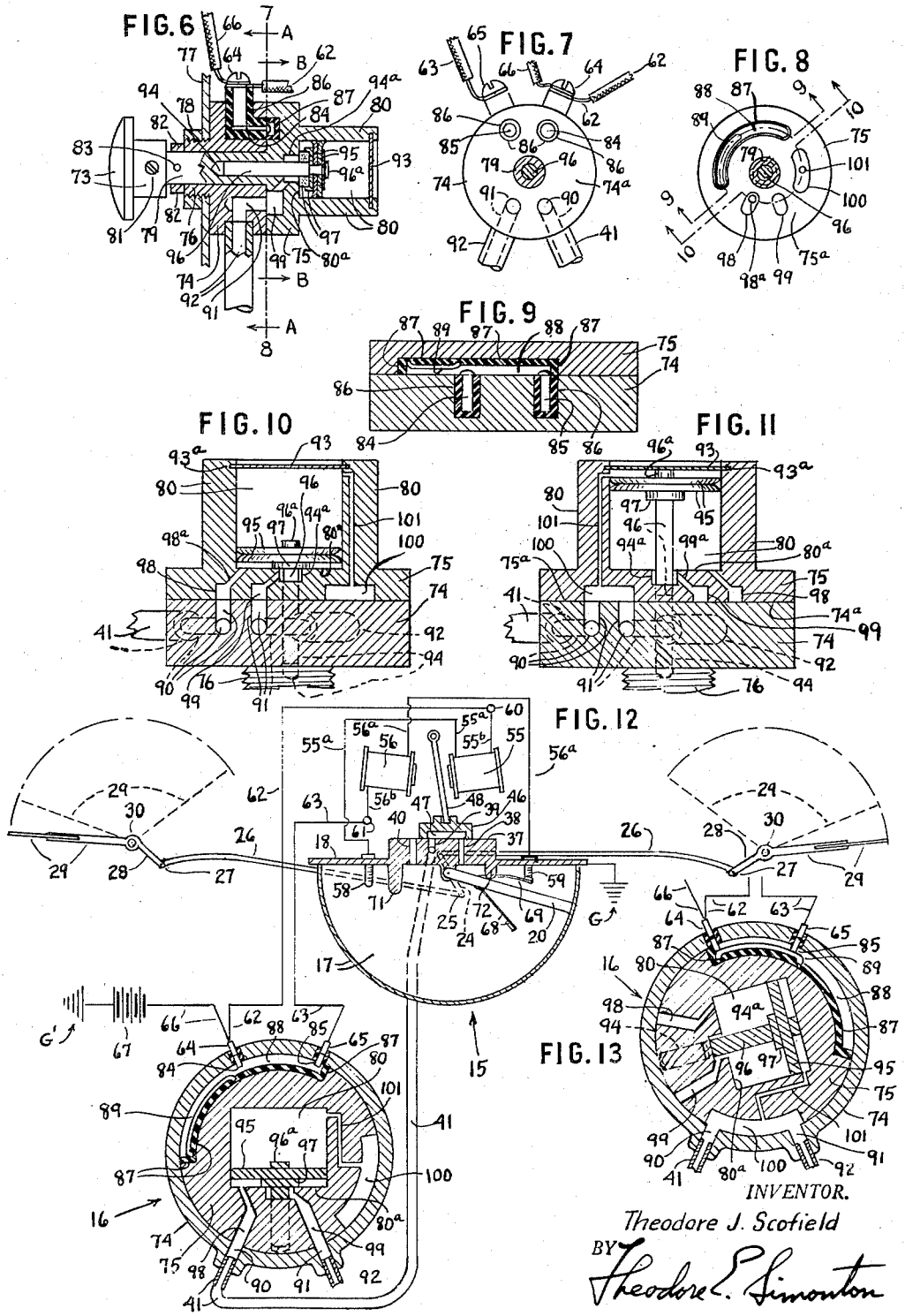
INVENTOR.
Theodore J. Scofield
BY Theodore E. Simonton
ATTORNEY Patented Aug. 29, 1950

2,520,344

UNITED STATES PATENT OFFICE 2,520,344

WINDSHIELD WIPER ACTUATING MEANS

Theodore Johnson Scofield, Jackson, Mich.

Application April 11, 1946, Serial No. 661,447

9 Claims. (Cl. 15—253)

The invention relates to improvements in actuating means for motor vehicle windshield wipers.

The principal objects of the invention are to provide improved means for actuating a windshield wiper and for maintaining said wiper, when desired, in a predetermined idle position; to provide an improved manually controlled and electro-pneumatically operated mechanism for actuating, as long as may be desired, a windshield wiper, or pair of wipers, and for insuring, upon actuation of the manual control means of said mechanism to an operation-stopping position of said means, movement of the wiper or wipers into, and retention thereof in, a predetermined normal idle or "parked" position; and to provide improved manually controlled means for vibrating a windshield wiper or wipers as long as may be desired through a fixed arc for cleaning action of the wiper or wipers and for moving each said wiper beyond one limit of its arc of cleaning movement into a predetermined normal idle or "parked" position; and to provide an electro-pneumatically operated means for actuating a windshield wiper or wipers and a combined air-control valve and electric switch for controlling said electro-pneumatically operated actuating means for the windshield wiper or wipers.

Other objects and advantages of the invention will be apparent to those skilled in the art from the following detailed description of a preferred embodiment of the invention illustrated in the accompanying drawings.

In the drawings:

Figure 1 is a plan view of an actuating means for a pair of windshield wipers illustrating a preferred embodiment of the invention, the actuating means being shown in a normal idle condition in which the wipers are "parked" in a position, such as along the lower edge of the usual glass panels of a windshield, in which they will not obstruct vision through the windshield, a cover plate for a part of the wiper actuating means hereinafter described being omitted;

Figure 2 is a sectional view on the line 2—2 of Figure 1;

Figure 3 is a sectional view on the line 3—3 of Figure 1;

Figure 4 is a detail plan view showing on an enlarged scale certain valve parts illustrated in Figure 1;

Figure 5 is a fragmentary sectional view on an enlarged scale taken on line 2—2 of Figure 1 and showing on an enlarged scale certain parts illustrated in Figure 2;

Figure 6 is a sectional view of the control device unit of the wiper actuating means taken on the line 6—6 of Figure 1;

Figure 7 is a detail view of the control device unit taken on the line 7—8 of Figure 6 and looking in the direction indicated by the arrows A;

Figure 8 is a detail view of the control device unit taken on the line 7—8 of Figure 6 and looking in the direction indicated by the arrows B;

Figure 9 is a fragmentary sectional view of the control device unit taken through the unit approximately on the irregular line 9—9 of Figure 8;

Figure 10 is a fragmentary and partially diagrammatic detail sectional view of the control device unit taken through the unit approximately on the irregular line 10—10 of Figure 8;

Figure 11 is a view similar to Figure 10 wherein the parts illustrated are shown in the positions they occupy during operation of the actuating means for vibrating the wiper or wipers for cleaning action;

Figure 12 is a digrammatic view illustrating an installation of the actuating means with the parts in normal idle condition; and Figure 13 is a fragmentary diagrammatic view corresponding to Figure 12, but illustrating the control device unit as it is positioned during wiper vibrating actuation of the actuating means.

This application for patent is a continuation in part of my application for patent for Windshield Wiper Motor, Serial No. 401,143, filed July 5, 1941, upon which Patent No. 2,399,833 was granted May 7, 1946.

The improved windshield wiper actuating means, as shown in a preferred embodiment thereof illustrated in the drawings, comprises primarily a wiper actuating motor unit and a control unit for said motor unit, designated generally in Figures 12 and 13, respectively, by the reference numerals 15 and 16. The casing of the motor unit comprises a segmental metallic body portion 17 of substantially U-shape in cross section and a metallic cover portion 18 fastened to the body portion 17, as by screws 19, to form with said body portion a segmental piston chamber in which is vibrative a wiper-actuating piston vane 20 of the oscillating vane type.

Piston vane 20 is formed of metal and has a hub portion 20ª fixed to a wiper actuating metallic shaft 21 which extends transversely of the piston chamber under and closely adjacent cover 18 and is coaxial with the axis of curvature of the segmental piston chamber, said shaft being journaled in suitable bearings 22 and 23 carried by body portion 17 of the motor casing. One end of shaft 21 extends outwardly beyond the adjacent shaft bearing 23 and has fixed thereto, to oscillate therewith, a wiper actuating arm or lever 24 which in the construction shown extends in opposite directions from said shaft and is provided at its ends with two pivot studs 25 to which are pivotally connected two links 26 which in turn are pivotally connected at 27 with arms 28 of a pair of windshield wipers 29 of any suitable and conventional form journaled on the motor vehicle at 30. The wipers 29 are so mounted on the vehicle that, in the normal idle condition of the actuating means, each wiper extends along an edge of a transparent portion of the windshield, said wipers, when idle, preferably extending horizontally, as shown, and being so journaled that they extend along the lower edge of the windshield while idle. The metallic piston vane 20 is rigid and preferably carries suitable flexible packings 31 to prevent leakage of air around its edges. A suitable flexible packing strip 32 is set in a transverse groove in cover 18 to seal the space between cover 18 and hub 20ᵃ of the piston vane against leakage of air past the piston between the hub and cover.

The body portion 17 of the casing is formed with pierced ears 33 for bolting of the casing to a suitable fixed part of the vehicle to rigidly support the casing, and also to electrically ground the casing to the vehicle as indicated at G in Figure 12 for the purpose hereinafter pointed out.

The cover part 18 of the casing is formed with an upwardly facing valve chamber 34 the upper end of which is covered by a disk-like metal cover plate 35 which is removably mounted in a suitable manner on the rim of the chamber to cover the chamber but to allow passage of air from the atmosphere into the chamber between the cover and rim of the chamber. Preferably the cover 35 is loosely and separably connected with part 18 of the casing by two screws (not shown) which pass through the cover 35 and are threaded in holes 36 in the rim of the valve-chamber-forming portion of part 18.

Part 18 of the casing is shaped to provide in the valve chamber 34 at one side of the chamber a flat valve seat 37 to the face of which extend three slot-like parts 38, 39 and 40, which are formed side by side in casing part 18. One end of an air conduit or suction line 41 is attached to part 18 of the motor casing at 42 and is in constant communication with the central port 39 through a bore or air passage 43 formed in part 18 and extending from said end of conduit 41 to port 39. The other end of suction line 41 is connected, as hereinafter described, to a stationary part 74 of the control unit 16. Also formed in part 18 are two bores or air passages 44 and 45. Bore 44 connects port 38 with the upper end of the piston chamber at one side of the piston 20, and bore 45 connects port 40 with the upper end of said chamber at the opposite side of said piston.

A valve 46 of block-like form is slidable back and forth on valve seat 37 transversely of the slot-like ports 38, 39 and 40 between two limits of movement of the valve. At one of said limits a cavity 47 in the under or seat-engaging side of the valve places port 39 in communication with port 38, and at the other one of said limits said cavity places port 39 in communication with port 40. When the valve is positioned to connect ports 39 and 38 it uncovers port 40 and thus places port 40 in communication with valve chamber 34, and when the valve is positioned to connect ports 39 and 40 it uncovers port 38 thus placing port 38 in communication with the valve chamber. As hereinbefore explained, the valve chamber is constantly connected to atmosphere.

For sliding the valve 46 alternately to said two limit positions, there is provided in the valve chamber a swingable valve actuating armature 48. The armature has a yoke-like end pivoted on a pin 49 the ends of which are mounted in the arms of a yoke-like boss 50 formed on part 18 within the valve chamber 34 at the opposite side of the chamber from that at which the valve seat 37 is located. Adjacent its free end the armature extends through, and removably but closely fits in, a slot 51 formed in and extending entirely across the top of valve 46. Also adjacent its free end, the armature has a notch 52 in its lower edge in which the valve 46 removably but closely fits above the seat-engaging face of the valve. The free end of the armature is alternately engageable with stop pins 53 and 54 to arrest the armature and valve with the valve at one or the other of its two limits of movement above described.

The armature is common to and extends between two electromagnets 55 and 56. The electromagnets are fixedly mounted on part 18 in the valve chamber 34 by suitable anchoring devices 57 with the magnets arranged at opposite sides of the armature between the valve 46 and the pivot 49 of the armature, each magnet being arranged to attract the armature when the magnet is energized. The magnets are alternatively energizable by means hereinafter described. When magnet 55 is energized, it draws the armature against stop 53 into the position shown in Figures 1, 2, 5 and 12 to position valve 46 to connect ports 39 and 38 as shown in Figures 1 to 5 and 12. When magnet 56 is energized, it draws the armature against stop 54 to position the valve to connect ports 39 and 40 and uncover port 38. The stop pins 53 and 54 arrest the armature before it actually contacts either magnet.

Two stationary electric switch contacts 58 and 59 are fixedly held to, and electrically insulated from, cover part 18 of the casing of motor unit 15 in suitable known manner. Two electric wire terminals 60 and 61 are fixedly held to, and electrically insulated from, the valve-chamber-forming portion 34 of the cover part 18 of the casing of the motor unit 15 in suitable known manner. One end 55ᵃ of the coil of electromagnet 55 is connected to switch contact 58, and one end 56ᵃ of the coil of electromagnet 56 is connected to switch contact 59. The other end 55ᵇ of the coil of electromagnet 55 is connected to terminal 60, and the other end 56ᵇ of the coil of electromagnet 56 is connected to terminal 61. Two electric circuit wires 62 and 63 are connected at one end respectively to terminals 60 and 61 which electrically connect said wire ends respectively to end 55ᵇ of the coil of magnet 55 and to end 56ᵇ of the coil of magnet 56. The other ends of circuit wires 62 and 63 are connected respectively to wire terminals 64 and 65 which are fixedly held to and electrically insulated from a stationary element 74 of control unit 16 as hereinafter described. A circuit wire 66 is electrically connected at one end thereof to wire 62 and to terminal 64 at said terminal and is connected at its other end to one terminal of an electric battery 67. The battery is carried by the motor vehicle in suitable known manner and has its other terminal grounded to the vehicle in known manner as indicated at G' in Figure 12.

Carried by the piston 20—31 of the motor unit at opposite faces thereof are two resiliently flexible metallic switch contacts or elements 68 and 69 for coaction respectively with switch contacts 58 and 59 as hereinafter described. A metal rivet 70 anchors the contact elements 68 and 69 at one end thereof to the piston adjacent the hub 20a of the piston and electrically connects said contact elements with the metal vane portion 20 of the piston so that the anchored ends of said contacts are constantly electrically grounded through said vane, the vane hub, shaft 21 and the casing of the motor unit 15 to the vehicle. From their anchored ends, the resilient contacts flare outward from each other to their free ends away from the opposite faces of the piston, said contacts extending toward the free end of the piston vane. The piston 20—31 and the contacts 68 and 69 carried thereby constitute the movable elements of a switch whose stationary terminals are the contacts 58 and 59.

Two fixed stops 71 and 72, formed on part 18, extend into piston chamber 17 at opposite faces of piston 20—31. Stop 72 is engaged by the piston to arrest the piston in wiper parking position. Stop 71 is a safety stop which the piston only engages in case of accidental overthrow of the piston toward contact 58. During vibration of the piston for imparting cleaning vibrations to the wipers, the piston movement is reversed before the piston engages either of the stops.

Functioning of the electro-pneumatically activative motor unit 15 above described is controlled by the control unit 16 hereinbefore mentioned, which now will be more fully described.

The control unit 16 comprises generally a combined electric switch and air flow control valve device having a single manually operable control handle or knob 73 which is reversely turnable from one to the other of two positions. In addition to its control handle, the combined switch and valve device or unit 16 comprises a stationary part 74 and a reversely turnable part 75 to which the handle is positively connected to turn said part 75 relatively to part 74 from one to the other of two positions to put the motor unit into and out of action. Part 75 has mounted therein a pneumatically controlled and automatically operating action-delaying valve hereinafter described.

Part 74 is of thick disk-like form and has projecting from one flat face thereof a reduced externally threaded extension 76 which is passed through a hole in a fixed part 77 of the motor vehicle (such as the usual instrument panel), and a nut 78 is threaded on said extension to stationarily but removably clamp part 74 to said vehicle part. The turnable part 75 is also of disk-like form and has one flat face 75a thereof abutting the other flat face 74a of part 74. Projecting from the opposite flat faces of part 75 axially of the parts 74 and 75, and formed integrally with part 75 are a stem or shaft 79 of round cross section and a piston cylinder 80. The stem or shaft 79 projects from face 75a of part 75 and is journaled in an axial bore formed in part 74 and in extension 76 of said part. Said stem projects outwardly beyond said extension 76. The operating handle or knob 73 is held to the outer end of the stem 79 by a set screw 81 for turning of part 75 with and by said handle. The abutting flat faces 74a and 75a of parts 74 and 75 are maintained in light but not air-sealing face contact by means of a collar 82 which is held to stem 79 as by a pin 83. Said abutted faces 74a and 75a are so held lightly abutted by the collar 82 as to permit a slow leakage of air therebetween from atmosphere for the purpose hereinafter pointed out.

The wire terminals 64 and 65 hereinbefore mentioned are held to the stationary part 74 of the control unit 16 and extend radially into the main disk-like portion of part 74. Terminal 64 is in contact at its inner end with the inner end of a switch contact or terminal 84, and terminal 65 is in contact at its inner end with the inner end of a switch contact or terminal 85. The switch contacts or terminals 84 and 85 extend into part 74 from that face 74a of part 74 which is abutted by the adjacent face 75a of rotative part 75 of the control unit.

The elements 64, 65, 84 and 85 are stationarily held to stationary part 74 and are electrically insulated from said part in any suitable manner, as by insulation, such as 86, indicated in Figures 6, 7 and 9. The switch contact elements 84 and 85 project slightly outward from face 74a of part 74, and the projecting ends of said contacts are preferably rounded as shown best in Figure 9, said contact elements being spaced circumferentially around the common axis of disk-like parts 74 and 75 and being equidistant from said axis.

The reversely rotative part 75 of the control unit 16 has formed therein, in the face 75a thereof which abuts face 74a of part 74, an arcuate channel concentric with the axis of part 75. Held in this channel is an arcuate strip 87 of insulating material, such as rubber, having in its outer face an arcuate channel 88 closed entirely around its sides, ends and bottom. The protruding rounded ends of switch contacts 84 and 85 extend into channel 88 and are contactive with the end walls of the channel to limit reverse turning of part 75 and of handle or knob 73 to determine the "On" and "Off" positions of the knob. Held in the bottom of the channel 88 is a metallic switch contact or bridge piece 89 which extends part way along said channel from one end of the channel. At the "Off" limit of rotation of knob 73 and part 75, the bridge piece or switch contact 89 is moved out of engagement with the contacts 84 and 85, as indicated in Figures 9 and 12, and at the other or "On" limit of rotation of knob 73 and part 75, the bridge piece engages and electrically connects said contacts 84 and 85 as indicated in Figure 13.

From the foregoing it will be observed that the control unit provides a switch and also provides an air-flow control valve operable concomitantly by knob 73. The air-flow control valve has associated therewith an automatic action delaying valve. The valve features of the control unit now will be fully described.

The stationary part 74 of unit 16 has two air passages or ports 90 and 91 extending therethrough and each opening at opposite ends thereof at the circumferential wall of said part 74 and at face 74a of said part. The ends of ports 90 and 91 which open at the circumferential wall of part 74 are respectively open to and in constant communication with one end of the air conduit 41 (hereinbefore described) and one end of an air conduit 92. It will be obvious from the preceding description that conduit 41 constantly connects port 90 of the control unit 16 with port 39—43 of motor unit 15. Air conduit 92 constantly connects port 91 of unit 16 with the suction or intake manifold (not shown) of the vehicle-driving internal combustion motor (not shown) of the motor vehicle. Other suitable sources of electric current and of air suction may be substituted for the battery 67 and the internal combustion motor, if desired, as will be obvious to those skilled in the art. Those ends of ports 90 and 91 which terminate at face 74ᵃ of part 74 are spaced around the axial line of part 74 equidistant from said line.

The outer end of the cylindrical piston-cylinder-forming extension 80 of rotative part 75 of control unit 16 is sealed by a disk-like end wall 93 which may be sprung or forced into a circumferential channel 93ᵃ in portion 80. Part 75 is formed with an axial bore 94 which extends from the other end wall 80ᵃ of cylinder 80 part way through stem portion 79 of said part and has an enlarged end portion 94ᵃ open at end wall 80ᵃ of the piston cylinder 80.

Reciprocal in the piston cylinder 80—80ᵃ—93 is an automatic action-delaying piston valve device comprising a piston 95 fixed to a guide stem 96 which has a sliding fit in bore 94 and is of smaller diameter than the enlarged end 94ᵃ of said bore. One end of the guide stem projects beyond the other face of the piston to provide an abutment 96ᵃ to abut cylinder end wall 93 as hereinafter described to limit the stroke of the piston in one direction. At the opposite face of the piston from abutment 96ᵃ, the stem 96 has fixed thereto a disk valve 97 adapted to close the open end of part 94ᵃ of bore 94, said valve being adapted to seat on the end wall 80ᵃ of cylinder 80—80ᵃ—93 around said end of bore portion 94ᵃ to close communication between said bore 94—94ᵃ and the cylinder and limit the storke of the piston in one direction.

Extending through part 75 are two ports or air passages 98 and 99. One end of each port 98 and 99 opens at face 75ᵃ of part 75. The other end of port 98 opens at end wall 80ᵃ of cylinder 80—80ᵃ—93 outwardly beyond the area of said end wall on which valve 97 is seatable. The other end of port 99 opens into the side of the enlarged portion 94ᵃ of bore 94. Preferably, the ports 98 and 99 are restricted in diameter or capacity adjacent their points of entry into cylinder 80 and bore portion 94ᵃ, respectively, as indicated at 98ᵃ and 99ᵃ. Formed in face 75ᵃ of part 75 is a channel-like port or air passage 100 which is curved in an arc about the axis of part 75 and is long enough to bridge the ports 90—91 in part 74 at the "On" limit of rotation of part 75. A restricted air passage or port 101 formed in part 75 constantly connects the channel or port 100 with cylinder 80—80ᵃ—93 adjacent end wall 93 of said cylinder even when abutment 96 is engaged with wall 93. As hereinbefore explained, the parts 74 and 75 are connected for relative turning with their faces 74ᵃ and 75ᵃ in light but not air tight contact.

The ports 90, 91, 98, 99 and 100 are spaced around and equidistant from the axial line of parts 74 and 75 and are so arranged that in the "Off" position of knob 73, the port 98 is in registry with part 90, the port 99 is in registry with port 91, and channel 100 is out of registry with ports 90 and 91; while in the "On" position of the knob 73, the ports 98 and 99 are out of registry with ports 90 and 91 and the channel 100 connects or bridges said ports 90 and 91.

Operation

The mode of operation of the above-described windshield wiper actuating means will be obvious to those skilled in the art but now will be described.

In the normally idle condition of said means with control knob or handle 73 thereof in its "Off" position, the parts of said means are positioned as shown in Figures 1 to 10, and as shown in full lines in Figure 12. In this condition of said means, the control knob 73 has been turned counterclockwise (as said knob is viewed in Figure 1) into "Off" position, and the part 75 of the control unit has been turned in unison with said knob in the same direction. The piston 20—31 of the motor unit 15 has been urged against stop 72 beyond one limit of the normal working range of vibration of said piston to force the wipers 29 into their respective "parked" positions shown in full lines in Figure 12. The normal working limits of vibration of each of two wipers 29 are indicated by the broken lines radiating from the pivots 30 in Figure 12. In their "parked" position, the wipers extend preferably horizontally, or substantially so, as shown.

In this condition of the actuating means, both of the electromagnets 55 and 56 which vibrate valve 46 are de-energized, valve 46 is positioned to connect ports 38 and 39, and the delayed action valve 97 has seated and cut off communication between ports 90 and 91 so that piston 20—31 is subject at one side thereof to atmospheric pressure through port 40—45 and at its opposite face has been finally cut off from the source of suction by the seating of valve 97. The wipers 29 are thus normally maintained in "parked" position by atmospheric pressure on one side of piston 20—31 without maintaining suction from the source of suction at the other side of the piston.

To put the wiper actuating means into action for vibrating the wipers back and forth through their working range of wiping action as long as may be desired, it is simply necessary to turn the knob 73 to its other limit of movement or "On" position, the knob being turned to its "On" position in clockwise direction as the knob is viewed in Figure 1. When the control knob is so turned, the wiper actuating means operates as will now be described. Part 75 of the control unit is turned by the knob into the position indicated in Figures 11 and 13, causing bridge piece 89 to connect switch contacts 64 and 65 until the knob is again turned to "Off" position. This turning of part 75 also carries ports 98 and 99 in part 75 out of communication with ports 90 and 91 in part 74 of the control unit and causes channel port 100 in part 75 to directly connect ports 90 and 91 in part 74. With the parts so positioned, the motor unit will act to vibrate the piston 20—31 and the wipers 29 through their respective normal ranges of vibration until the knob 73 is again turned to "Off" position. A description of a single cycle of such operation of the motor unit will suffice.

Upon turning of the knob to "On" position, current first flows from one terminal of battery 67 via wire 66, contact 84, bridge piece 89, contact 85, and wire 63, through magnet 56 to contact 59, which at this time is grounded at G through contact 69, piston 20—31 and casing 17—18 of the motor unit. Since the other terminal of the battery is grounded at G', the magnet 56 is immediately energized and draws armature 48 against stop 54, thereby causing valve 46 to connect ports 43—39 with port 40—45 and open port 38—44 to atmosphere via chamber 34, whereupon piston 20—31 will be moved toward stop 71 and the contact 68 will be pressed against contact 58.

The movement of the piston 20—31 toward stop 71 breaks the circuit through magnet 56 upon separation of contacts 59 and 69, and closes a circuit through magnet 55 upon engagement of contacts 58 and 68. Upon engagement of contacts 58 and 68, current flows via wires 66 and 62 through magnet 55 to ground G via contact 58, contact 68, piston 20 and casing 17—18, and thence back to battery via ground G'. When magnet 55 is energized, it draws the armature back again against stop 53 and causes valve 46 to connect port 39—43 and port 38—44 and to open port 40 to atmosphere via chamber 34. Piston 20—31 will thereupon be forced back toward its normal idle position (breaking the circuit through magnet 55 as contacts 58 and 68 separate), but, before the piston reaches this position and reaches stop 72, the contact 69 will engage contact 59 and re-energize magnet 56, to actuate valve 46 and reverse the direction of travel of the piston at a point where the piston is still spaced a substantial distance from stop 72 and reversing the travel of the wipers before they reach "parked" position. The contacts 58 and 68 engage and cause reversal of direction of travel of the piston just before the piston can engage safety stop 71.

Within a short time after turning of knob 73 into "On" position, the piston 95 will have been slowly moved from the position thereof shown in Figures 6, 10 and 12 into the position shown in Figures 11 and 13, due to slow suction from one end of cylinder 80 via restricted passage 101, channel 100, port 91 and suction conduit 92, and to slow leakage of air from atmosphere between faces 74ª and 75ª of parts 74 and 75, and thence to the other end of cylinder 80 via ports 98—98ª and 99—99ª which also have restricted portions.

When it is desired to stop the automatic wiping vibration of the wipers and restore them to "parked" position, the knob 73 is turned back to its "Off" position, whereupon the wiper actuating means will re-assume the normal idle condition thereof and restore the wipers to and maintain them in "parked" position, irrespective of the position of piston 20 and of wipers 29 at the instant of turning of the knob to "Off" position, as now will be explained.

As soon as knob 73 is turned to "Off" position, the contacts 84 and 85 are no longer electrically connected and, consequently, the magnet 56 cannot thereafter be energized by engagement of contacts 59 and 69 until the knob is again turned to "On" position. While the turning of the knob 73 from "On" to "Off" position breaks the air suction communication via channel 100 and ports 90 and 91 between conduits 41 and 92, such turning immediately establishes a restricted air suction communication between conduits 41 and 92 via ports 90 and 98—98ª, the inner end of cylinder 80, enlarged portion 94ª of bore 94, and ports 99—99ª and 91. It will be remembered that, in the running condition of the wiper actuating means, the piston 95 is in the position shown in Figures 11 and 13, with abutment 96ª engaged with outer end wall 93 of the cylinder 80 and that the piston 95 can only move slowly to seat valve 97 on the inner end wall 80ª of cylinder 80 to eventually cut off (as shown in Figures 6 and 10) the above mentioned restricted communication between conduits 41 and 42. Notwithstanding the fact that magnet 56 cannot be energized while the knob 73 is turned into "Off" position, magnet 55 still can be energized by engagement of contacts 58 and 68 to place and leave valve 46 in the position shown in Figures 1, 2, 3, 4, 5 and 12. Consequently, the parts will always assume normal idle position shortly after turning of knob 73 to "Off" position, irrespective of the position of piston 20—31 at the time of turning of the knob, and will remain in normal idle position until the knob is turned to "On" position.

The delayed action piston valve device 95—96—97 insures maintenance of suction for a sufficient time to move the wipers 29 into "parked" position and then cuts off said suction by means of valve 97 so that, during any long idle condition of the wiper actuating means, the suction conduit 92 is cut off at the control unit from communication with the chamber 17 of vane piston 20 notwithstanding the fact that conduit 41 is open to said chamber 17 via port 39—43, valve 46, and port 38—44. Consequently, there is no constant suction pull on piston 20—31 while the latter is against stop 72 during long idle periods of the wiper actuating means, the piston 20—31 being held against stop 72 by atmospheric pressure during such periods. When piston 20—31 moves to its wiper parking position against stop 72, the flexible contact 69 is additionally flexed beyond the extent to which it flexes during the automatic wiper vibrating strokes made by the piston while knob 73 is in "On" position. The piston 20—31, contacts 68 and 69, contacts 58 and 59, and stops 71 and 72 are so relatively arranged that the limits of the wiper vibrating strokes of the piston, during automatic windshield cleaning vibration of the wipers, are determined by the engagements alternately of contacts 68 and 69 with contacts 58 and 59, these parts being arranged to reverse the direction of travel of the piston before the piston engages the stops while the motor unit is acting to vibrate the wipers for cleaning action of the latter.

I claim:

1. In a windshield cleaner motor having a piston adapted to be operated by differential fluid pressure on opposite sides of said piston and having valve means for reversing said differential pressure to reverse the stroke of said piston, in combination, electrically operated means for actuating said valve means to reverse said piston and to define normal limits to the stroke of said piston in either direction, and an electric circuit which includes a manually operated switch and which is so connected with said electrically operated means as to motivate the latter while said switch is closed and as always to, upon opening of said switch, stop said valve action during a piston stroke in a predetermined direction with the valve means positioned for continuation of that piston stroke beyond the normal limit of the piston stroke.

2. In a windshield cleaner fluid pressure motor for operating a wiper element and having a piston movable back and forth in a piston chamber, and a valve for controlling the application of fluid pressure to opposite sides of said piston, in combination, electrically operated means for actuating said valve to reverse said piston and to define normal limits to the stroke of said piston in either direction, said electrically operated means including a pair of electromagnets and electric switching means controlled by said fluid pressure motor for alternately energizing said electromagnets from a source of electric power to shift the valve to alternate stroke reversing positions, one side of one of said electromagnets being directly connected to one side of said source, and a manually operated switch in circuit between one side of the other of said electromagnets and the same side of said source, whereby upon opening said manually operated switch said valve action will stop with the valve positioned by the first mentioned one of said electromagnets for a piston stroke in a predetermined direction to a position beyond the normal limit of the piston stroke to park said wiper element.

3. In a windshield wiper actuating means having a fluid pressure motor provided with a piston chamber, a wiper vibrating piston reciprocal in said chamber, and with valve means movable alternately to two positions to connect said chamber alternately at opposite sides of the piston with a suction conduit to effect reciprocation of the piston, the combination with said motor of a control valve device manually movable to one position to open a communication between said valve means of the motor and the suction conduit to put said motor into operation and manually movable to a second and motor stopping position to close said communication and open a second communication between said valve means and conduit, automatic valve means associated with said control valve device and responsive to suction through said second communication to close said communication upon elapse of a predetermined time interval following manual movement of said control valve device to its second position, and electrical actuating means for alternately moving the valve means of the motor to said two positions of said valve means in response to opposite strokes of predetermined extent of the motor piston, and a switch associated with said manually movable control valve device to condition said electrical actuating means for operation when said control valve device is moved to its first position and to subsequently disable said actuating means with said motor valve means positioned in a predetermined one only of its two positions following movement of said control valve device to its second position.

4. In a windshield wiper actuating means having a fluid pressure motor provided with a piston chamber, a wiper vibrating piston reciprocal in said chamber, and with valve means movable alternately to two positions for connecting said chamber alternately at opposite sides of the piston with a suction conduit to effect reciprocation of the piston, the combination with said motor of a manually movable control element therefor movable to a position to put said motor into operation and to a second position to disable said motor, a valve device responsive to movement of said control element to its first position to place said valve means of the motor in communication with the suction conduit and responsive to movement of said control element to its second position to maintain said valve means in communication with the suction conduit for a predetermined time interval and then close said communication until the control element is again moved manually to its first position, and means responsive to movement of the control element respectively to its first and second positions to respectively automatically move the motor valve means alternately to its two positions and to cause said valve means to assume and remain in a predetermined one of its two positions until said control element is again moved to its first position.

5. A windshield wiper actuating means, as claimed in claim 3, wherein the motor piston is movable an added extent in a predetermined direction beyond a predetermined one of its normal stroke limits in response to said temporary maintenance of said second communication which follows movement of said control valve device to its said second position, and wherein a stop is provided to limit such added movement of the piston.

6. A windshield wiper actuating means, as claimed in claim 4, wherein the motor piston is movable a predetermined distance in one direction beyond its normal range of reciprocation to park an actuated wiper beyond one limit of the normal zone of cleaning vibration of the wiper, and wherein said piston is movable through said distance by suction through said conduit maintained for said predetermined time interval following movement of the control element to its second position.

7. A windshield wiper actuating means, as claimed in claim 4, wherein the means for automatically moving the motor valve means comprises electromagnetic means for shifting said valve means in response to a predetermined travel of the motor piston in each direction, and an energizing electric circuit for said electromagnetic means having therein a switch operable by said control element to a closed position conditioning said circuit to put said electromagnetic means into action and to an open position conditioning said circuit to bring said motor valve means to rest by movement of said control element respectively to its first and second positions.

8. A remote control unit, for putting into and out of action a windshield wiper actuating motor which is connective with a source of suction and has electrically operable valve means for alternately subjecting opposite sides of a wiper actuating piston to suction from said source, comprising a control switch for an energizing electric circuit for said valve means, a suction conduit shut-off valve device having inlet and outlet suction conduit connections, and a manually movable control element for said switch and said valve device connected with said switch to cause opening and closing of the switch and connected with the valve device to cause the valve device to open a path of fluid flow between its conduit connections upon closing of said switch and to close said path upon opening of said switch.

9. A control unit, as claimed in claim 8, wherein said valve device includes suction controlled valve means to temporarily open and thereafter automatically close a second path of fluid flow between the conduit connections of the valve device upon each closure of the first mentioned path.

THEODORE JOHNSON SCOFIELD.

REFERENCES CITED

The following references are of record in the file of this patent:

UNITED STATES PATENTS

| Number | Name | Date |
|---|---|---|
| 1,989,846 | Christman | Feb. 5, 1935 |
| 2,012,804 | Bean | Aug. 27, 1935 |
| 2,209,921 | Horton | July 30, 1940 |
| 2,245,626 | Twiss | June 17, 1941 |
| 2,257,066 | O'Shei | Sept. 23, 1941 |
| 2,399,833 | Scofield | May 7, 1946 |